United States Patent
Miller et al.

(10) Patent No.: US 11,243,082 B2
(45) Date of Patent: Feb. 8, 2022

(54) CARDAN JOINT FOR INERTIALLY STABILIZING A PAYLOAD

(71) Applicant: Raytheon Company, Waltham, MA (US)

(72) Inventors: Kirk A. Miller, Dallas, TX (US); Jason R. Lavine, McKinney, TX (US)

(73) Assignee: Raytheon Company, Waltham, MA (US)

( * ) Notice: Subject to any disclaimer, the term of this patent is extended or adjusted under 35 U.S.C. 154(b) by 144 days.

(21) Appl. No.: 16/721,662

(22) Filed: Dec. 19, 2019

(65) Prior Publication Data

US 2021/0190500 A1    Jun. 24, 2021

(51) Int. Cl.
*G01C 21/18*   (2006.01)
*G01D 11/10*   (2006.01)
*G01D 11/30*   (2006.01)
*F16M 11/12*   (2006.01)
(Continued)

(52) U.S. Cl.
CPC ........... *G01C 21/18* (2013.01); *F16M 11/123* (2013.01); *F16M 13/022* (2013.01); *G01D 11/10* (2013.01); *G01D 11/30* (2013.01); *G03B 17/561* (2013.01)

(58) Field of Classification Search
USPC ....................................................... 73/430
See application file for complete search history.

(56) References Cited

U.S. PATENT DOCUMENTS 4,498,038 A  *  2/1985  Malueg ................. B64D 47/08
                                                             248/550
5,368,271 A     11/1994  Kiunke et al.
(Continued)

FOREIGN PATENT DOCUMENTS

CN    100585052 C    1/2010
EP    2798314 A1    11/2014
(Continued)

OTHER PUBLICATIONS

Kyhl, Curtis, U.S. Appl. No. 16/984,002, filed Aug. 3, 2020.
(Continued)

*Primary Examiner* — Clayton E. LaBalle
*Assistant Examiner* — Warren K Fenwick

(57) ABSTRACT

A cardan joint includes a cross-elevation assembly comprising a cross-elevation housing, a roll-elevation assembly comprising a roll-elevation housing, a payload interface assembly comprising a payload interface housing, and a suspension interface yoke comprising a suspension interface that couples the suspension interface yoke to one or more suspension bars. The roll-elevation assembly is rotatably connected to the cross-elevation assembly along a first rotation axis via a radial roller bearing and a thrust roller bearing. The payload interface assembly is rotatably connected to the roll-elevation assembly along a second rotation axis via a radial roller bearing and a thrust roller bearing. The suspension interface yoke is rotatably connected to the cross-elevation assembly along a third rotation axis via one or more radial roller bearings and one or more thrust roller bearings. The payload interface housing comprises a payload interface operable to couple the payload interface housing to an inertially stabilized payload.

20 Claims, 7 Drawing Sheets

(51) Int. Cl.
  *F16M 13/02* (2006.01)
  *G03B 17/56* (2021.01)

(56) References Cited

U.S. PATENT DOCUMENTS

| | | | | |
|---|---|---|---|---|
| 5,897,223 | A * | 4/1999 | Tritchew | G03B 15/006 396/13 |
| 6,454,229 | B1 * | 9/2002 | Voigt | G01C 21/18 248/182.1 |
| 6,484,978 | B2 * | 11/2002 | Voigt | G01C 21/18 248/182.1 |
| 11,059,430 | B2 | 7/2021 | Higashimachi et al. | |
| 2008/0158371 | A1 | 7/2008 | Trescott | |
| 2009/0216394 | A1 | 8/2009 | Heppe et al. | |
| 2014/0055617 | A1 | 2/2014 | Minikey, Jr. et al. | |
| 2017/0175948 | A1 * | 6/2017 | Zeise | F16M 11/126 |
| 2020/0247329 | A1 | 8/2020 | Robertson, Jr. et al. | |
| 2020/0392987 | A1 | 12/2020 | Koike et al. | |

FOREIGN PATENT DOCUMENTS

| | | |
|---|---|---|
| EP | 3220006 A1 | 9/2017 |
| JP | 2000-214745 A | 8/2000 |
| JP | 2002-154491 A | 5/2002 |
| JP | 5090293 B2 | 12/2012 |
| KR | 101362926 B1 | 2/2014 |
| KR | 101979293 B1 | 5/2019 |
| WO | WO 1996/02770 A1 | 2/1996 |
| WO | WO 2015/149079 A1 | 10/2015 |
| WO | WO 2017/179160 A1 | 10/2017 |
| WO | WO 2018/107330 A1 | 6/2018 |

OTHER PUBLICATIONS

Leonardo Drs, Mast Muonted Sight (MMS), https://www.leonardodrs.com/media/3296/mms_datasheet.pdf, to the best of applicant's knowledge article was available before the application filing date, 2 pages, Melbourne, Florida.
International Search Report for International Application No. PCT/US2020/056155 dated Feb. 23, 2021, 32 pages.
International Search Report for International Application No. PCT/US2020/056167 dated Feb. 12, 2021, 15 pages.
International Search Report for International Application No. PCT/US2020/056126 dated Feb. 3, 2020, 10 pages.
International Search Report for International Application No. PCT/US2020/056135 dated Feb. 11, 2020, 14 pages.
International Search Report for International Application No. PCT/US2020/056148 dated Feb. 16, 2021, 14 pages.
International Search Report for International Application No. PCT/US2021/010033 dated Nov. 24, 2021, 10 pages.

* cited by examiner

CARDAN JOINT FOR INERTIALLY STABILIZING A PAYLOAD

BACKGROUND

Imaging and sensing devices (e.g., electro-optical sensors, cameras, microphones, and/or audio recording/sensing devices) are utilized in a wide variety of situations, conditions, applications, and systems. For example, imaging devices are used on a wide variety of moving vehicles travelling on land, sea, or through the air. In such situations, an imaging device on a moving vehicle is required to maintain focus on a variety of points, including far distant points, and to obtain stable imagery and sensing on the various points while the vehicle is in motion. As such, outside movements of a system (e.g., vehicle) to which the imaging device is attached can affect the stability or efficacy of the imaging device. Consequently, images taken by the imaging device can be compromised, blurry, unclear, or unhelpful due to the movements of the system. Furthermore, sensing results of imaging devices, audio recording/sensing devices, and/or optical sensors can be inaccurate or unobtainable due to the effects of these outside movements on the sensor. Outside movements can be those that result from the system undergoing normal or intended operation (e.g., temporal angular movements of a moving vehicle), as well as movements resulting from one or more unintended forces, or forces acting on the system (shock loads, vibration, and others).

In order for an imaging or sensing device to achieve stable sensing and/or imagery, it is advantageous for the imaging or sensing device to be stabilized against the outside movements of a system. Stabilization of the imaging or sensing device can minimize the effect that the outside movements have on the imaging or sensing device. In one example, an audio recording/sensing device, optical sensor, or imaging device can be mounted on a gimbal to isolate the device from the movements of the system in one or more rotational degrees of freedom, A cardan joint is one example of a gimbal-like device to which an imaging device, electro-optical sensor, or other device which requires stabilization from outside movement of a system, can be mounted in order to minimize the effects of the outside movements on the device.

Many cardan joints utilize an angular contact bearing or flexure element to isolate a device from movement in a system. However, these configurations have significant drawbacks in that the cardan joints that utilize these configurations are limited in their load carrying capacity. For example, under dynamic shock loads the forces transmitted through a cardan joint can be very high, as much as fifteen times the device weight. In cardan joints that use an angular contact bearing, the single angular contact bearing carries both radial loads and axial loads, which places excess stress on the bearing and can cause failure of the bearing if loads are too high. Similarly, in cardan joints that utilize a flexure element, the flexure element must also carry both radial loads and axial loads, which can cause failure if loads are too high. In some applications, random vibrations and shock radial and axial loads in such cardan joints cause the angular contact bearing or flexure element to fail, unless the angular contact bearing and flexure element are very large, which can be unacceptable and impractical due to available space limitations. Since such cardan joints that utilize angular contact bearings and/or flexure elements can be larger than are otherwise desirable, these cardan joints can be unhelpful in certain applications. Additionally, current cardan joints do not include integral angle measurement systems to measure movement and displacement of various elements within the cardan joint.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
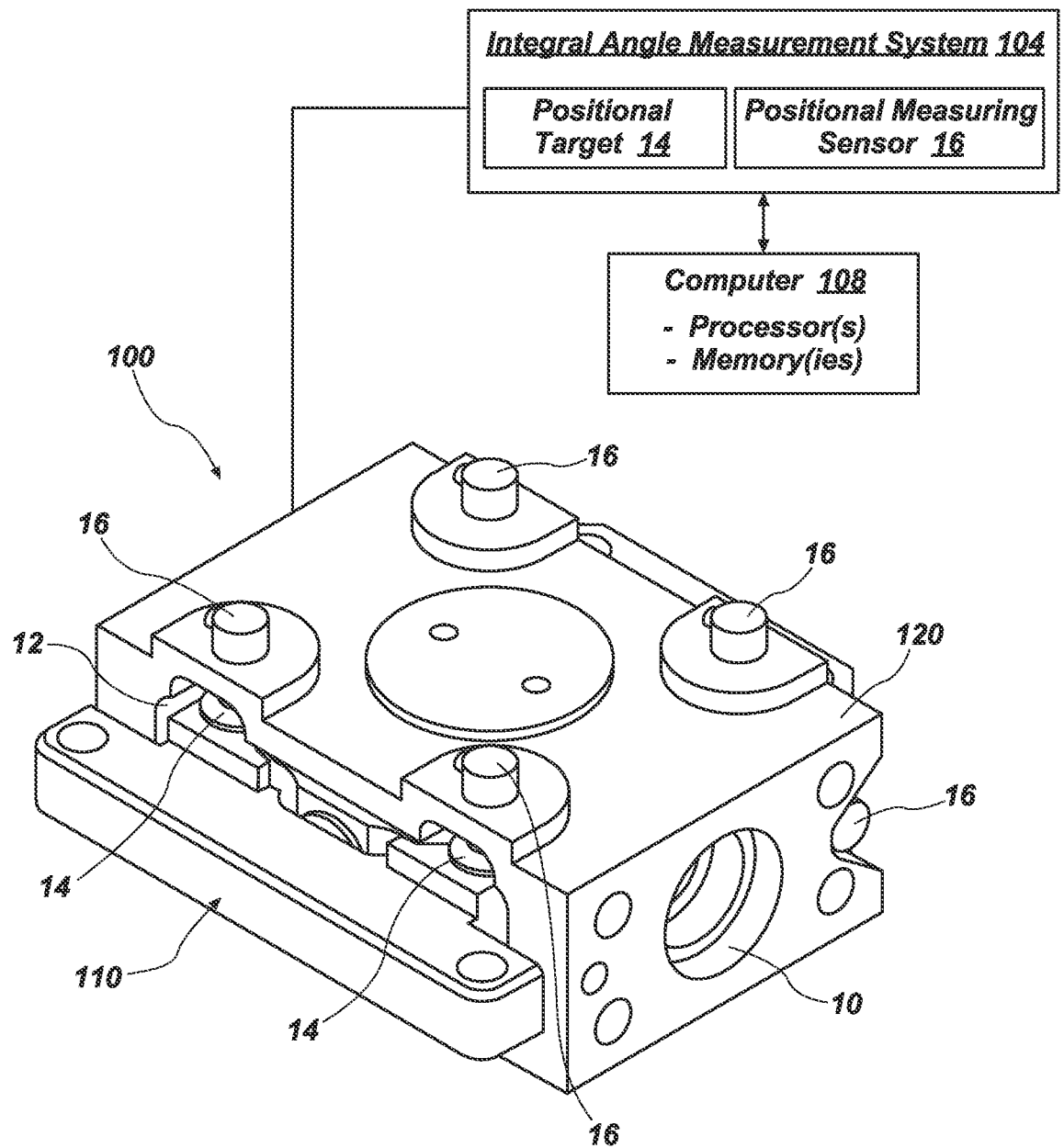
FIG. 1 is an isometric view of a cardan joint according to an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure is directed to a cardan joint for stabilizing a device mounted on a moving system. The present disclosure is also directed to various cardan joint assemblies and a system for inertially stabilizing a payload by mounting the payload to the cardan joint assembly. In at least one example, the cardan joint assembly can comprise a cross-elevation assembly, a roll-elevation assembly, a payload interface assembly, and a suspension interface yoke, each nested together or with one another.

In at least one example, the cross-elevation assembly can comprise a cross-elevation housing which can be disposed within the roll-elevation assembly. The roll-elevation assembly can comprise a roll-elevation housing, which can be disposed around a perimeter of the cross-elevation housing. The roll-elevation assembly can be rotatably connected to the cross-elevation assembly along a first rotation axis via one or more radial roller bearings and one or more thrust roller bearings supported between the cross-elevation housing and the roll-elevation housing. The roll-elevation housing can be disposed within the payload interface assembly.

In at least one example, the payload interface assembly can comprise a payload interface housing, which can be disposed around a perimeter of the roll-elevation housing and can comprise a payload interface operable to couple the payload interface housing to an inertially stabilized payload. The payload interface assembly can be rotatably connected to the roll-elevation assembly along a second rotation axis offset from the first rotation axis via one or more radial roller bearings and one or more thrust roller bearings supported between the roll-elevation housing and the payload interface housing. The cross-elevation assembly, the roll-elevation assembly, and the payload interface assembly can all be disposed within the suspension interface yoke.

The suspension interface yoke can partially surround the cross-elevation assembly, roll-elevation assembly, and payload interface assembly and can comprise a suspension interface that is operable to couple the suspension interface yoke to one or more suspension bars. The suspension interface yoke can be rotatably connected to the cross-elevation assembly along a third rotation axis, offset from both the first rotation axis and the second rotation axis, via one or more radial roller bearings and one or more thrust roller bearings supported between the cross-elevation housing and the suspension interface yoke. Each of the first rotation axis, second rotation axis, and third rotation axis can be offset from the other two axes in such a manner that each axis is perpendicular to both of the other two axes.

In at least one example, the cardan joint can further comprise a pair of first axles along the first rotation axis, a pair of second axles along the second rotation axis, and a pair of third axles along the third rotation axis. The pair of first axles can rotatably connect the roll-elevation housing to the cross-elevation housing. The pair of second axles can rotatably connect the payload interface housing to the roll-elevation housing. The pair of third axles can rotatably connect the suspension interface yoke to the cross-elevation housing. To rotatably connect the housings to each other, the pair of first axles can be inserted through holes or apertures formed in the roll-elevation housing and into holes or apertures formed in the cross-elevation housing, the pair of second axles can be inserted through holes or apertures in the payload interface housing and into holes of apertures formed in the roll-elevation housing, and the pair of third axles can be inserted through holes or apertures formed in the suspension interface yoke and into holes or apertures formed in the cross-elevation housing.

Additionally, in at least one example, the pairs of first, second, and third axles can support the one or more radial roller bearings and the one or more thrust roller bearings between the various housings. For example, the pair of first axles can support the one or more radial roller bearings and the one or more thrust roller bearings between the cross-elevation housing and the fine elevation housing; the pair of second axles can support the one or more radial roller bearings and the one or more thrust roller bearings between the roll-elevation housing and the payload interface housing; and the pair of third axles can support the one or more radial roller bearings and the one or more thrust roller bearings between the cross-elevation housing and the suspension interface yoke. In one example, each of the plurality of radial roller bearings can be needle radial roller bearings, and each of the plurality of thrust roller bearings can be needle thrust roller bearings. Additionally, on each of the pairs of first, second, and third axles, the one or more radial roller bearings can be disposed closer to a center of the cardan joint than the one or more thrust roller bearings.

In at least one example the cardan joint can comprise a plurality of inner washers and a plurality of outer washers. On each of the first, second, and third axles, at least one inner washer can be disposed between the radial roller bearing and the thrust roller bearing, and at least one outer washer can be disposed on a side of the thrust roller bearing that faces away from the inner washer.

In at least one example, the cardan joint can include an integral angle measurement system that measures rotational movement and/or rotational positional displacement of each of the housings of the cardan joint housed within the suspension interface yoke. The integral angle measurement system can comprise a positioning target supported between the suspension interface yoke and at least one of the cross-elevation, roll-elevation, and payload interface housings, and a positional measuring sensor supported by the suspension interface yoke and positioned adjacent the positioning target. The integral angle measurement system operates to measure movement or positional displacement of the positioning target, which results from movement of at least one of the cross-elevation, roll-elevation, and payload interface housings relative to the suspension interface yoke.

In at least one example, the integral angle measurement system can further comprise a plurality of positioning targets supported between the suspension interface yoke and the at least one of the cross-elevation, roll-elevation, and payload interface housings, and a plurality of positional measuring sensors supported by the suspension interface yoke, each positional measuring sensor being positioned adjacent at least one of the plurality of positioning targets. Additionally, at least two positioning targets can be supported at directions that are offset from each other, for example, perpendicularly or otherwise transverse to each other. At least two positional measuring sensors can be supported by the suspension interface yoke at positions adjacent to the at least two positioning targets. Furthermore, integral angle measurement system can be a three-channel differential eddy current measurement bridge.

At least one example can describe a system for inertially stabilizing a payload. The system can comprise a support structure including one or more suspension bars, a payload, and a cardan joint of any of the examples or their equivalents described herein, which cardan joint is coupled to the support structure and the payload. The payload can be an imaging device, a sensor, or other device which needs to be stabilized or isolated from outside movements.

To further describe the present technology, examples are now provided with reference to the figures. FIG. 1 is an isometric view of an exemplary cardan joint 100 according to at least one example of the present disclosure. As illustrated in FIG. 1, cardan joint 100 can comprise an inner assembly 110 that is disposed within a suspension interface yoke 120. Suspension interface yoke 120, can further comprise a suspension interface 10 that can couple suspension interface yoke 120 to a support structure such as, for example, one or more suspension or crossbars, as part of a crossbar assembly. The function, operation, and components of suspension interface yoke 120 are described in further detail below with reference to other figures.

As further shown in FIG. 1, suspension interface yoke 120 can house inner assembly 110 within an inner cavity 12 of suspension interface yoke 120. Inner assembly 110 can be held within inner cavity 12 by one or more axles (described in further detail with reference to FIGS. 2 and 6 below), which can be supported by suspension interface yoke 120, and which engage with inner assembly 110. The function and operation of each of these elements, including various elements of inner assembly 110 that are obscured in FIG. 1, are described in further detail below with reference to FIGS. 2-6, which clearly show each of the various elements of inner assembly 110.

As illustrated in FIG. 1, cardan joint 100 can further include an integral angle measurement system 104 that measures movement and displacement of various separate elements of inner assembly 110 within suspension interface yoke 120. The integral angle measurement system 104 can comprise one or more positioning targets 14 that can be supported between suspension interface yoke 120 and inner assembly 110. The integral angle measurement system 104 can further comprise one or more positional measuring sensors 16, which are supported by suspension interface yoke 120 and positioned adjacent positioning targets 14. The function and operation of the integral angle measurement system 104 including positioning target 14 and positional measuring sensor 16 are described in further detail below with reference to FIG. 5.

Figure 2:
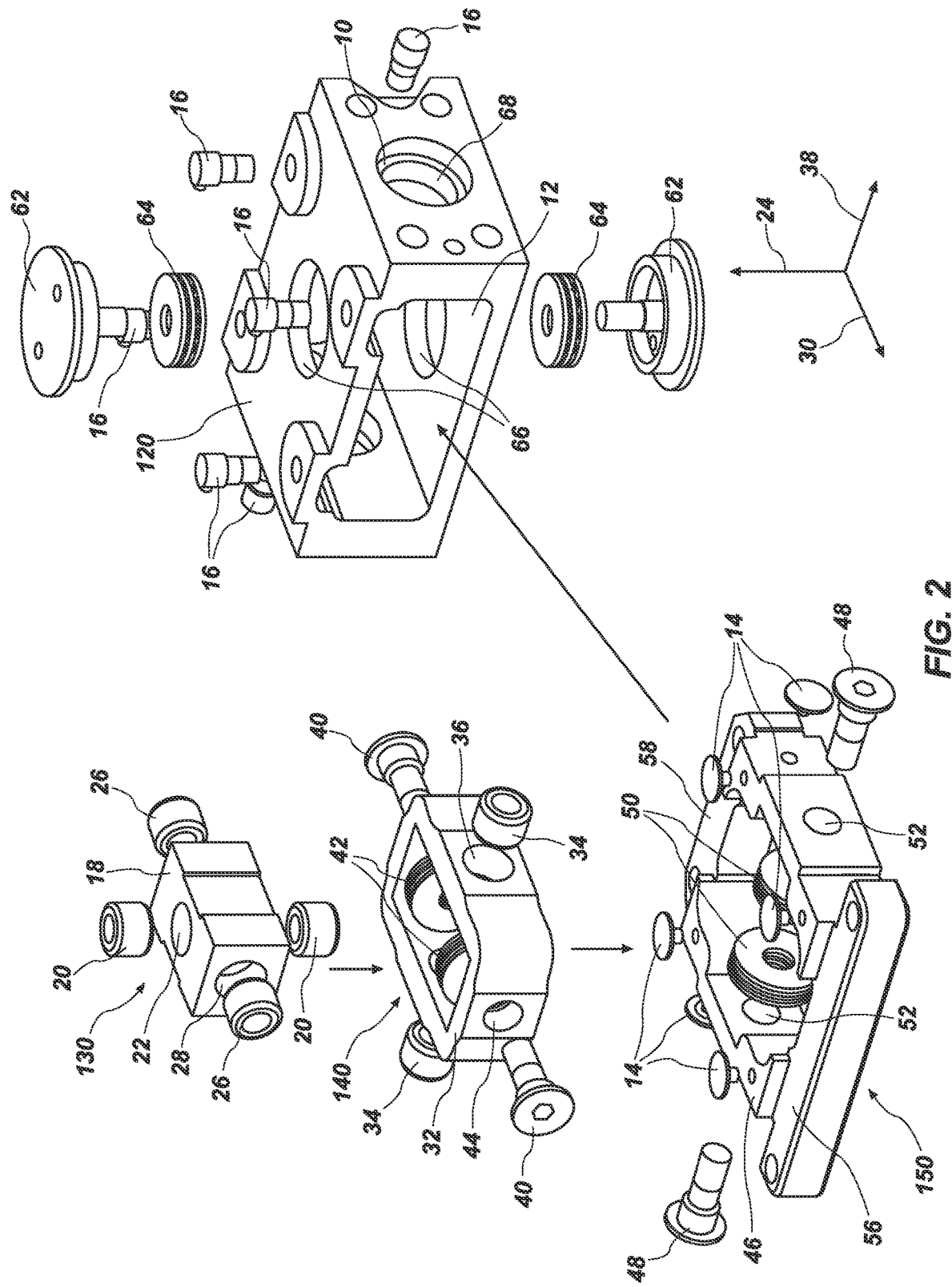
FIG. 2 is an exploded view of the cardan joint shown in FIG. 1.

With reference to FIG. 2, which is an exploded view, cardan joint 100 can comprise a suspension interface yoke 120, a cross-elevation assembly 130, a roll-elevation assembly 140, and a payload interface assembly 150. As illustrated in FIG. 2, cross-elevation assembly 130 can nest within roll-elevation assembly 140, and cross-elevation assembly 130 and roll-elevation assembly 140 can both together nest inside payload interface assembly 150 to form inner assembly 110 (shown in FIG. 3). Inner assembly 110 can be placed and held within inner cavity 12 of suspension interface yoke 120. Each of suspension interface yoke 120, cross-elevation assembly 130, roll-elevation assembly 140, and payload interface assembly 150 will now be described, along with a description of how each assembly fits together with the other assemblies.

As illustrated in FIG. 2, cross-elevation assembly 130 can comprise a cross-elevation housing 18 and one or more radial roller bearings recessed into cavities formed in cross-elevation housing 18. For example, as shown in FIG. 2, two cross-elevation radial roller bearings 20 can be disposed in cross-elevation cavities 22 formed on opposite sides of cross-elevation housing 18 along a cross-elevation rotation axis 24 (shown in FIG. 6). Furthermore, two roll-elevation radial roller bearings 26 can be disposed in roll-elevation cavities 28 formed in cross-elevation housing 18 along a roll-elevation rotation axis 30 (shown in FIG. 5). Cross-elevation cavities 22 and roll-elevation cavities 28 can be formed on perpendicular sides of cross-elevation housing 18. Cross-elevation rotation axis 24 and roll-elevation rotation axis 30 can be offset from each other. For example, cross-elevation rotation axis 24 and roll-elevation rotation axis 30 can be perpendicular to each other. Alternatively, cross-elevation rotation axis 24 and roll-elevation rotation axis 30 can be offset from each other in a manner in which they are not perpendicular to each other.

Roll-elevation radial roller bearings 26 and cross-elevation radial roller bearings 20 can be held in place, respectively, in roll-elevation cavities 28 and cross-elevation cavities 22 using adhesive, interference fitting, or any other suitable method for holding a bearing in place in a cavity. Roll-elevation radial roller bearings 26 and cross-elevation radial roller bearings 20 can be full complement needle radial roller bearings, which provide the highest load carrying capacity. However, the invention is not limited to this configuration. Alternatively, roll-elevation radial roller bearings 26 and cross-elevation radial roller bearings 20 can be any suitable type of radial roller bearings.

The cross-elevation assembly 130 can be shaped such that it can be inserted into and disposed within roll-elevation assembly 140, as will be described in further detail below.

As illustrated in FIG. 2, roll-elevation assembly 140 can comprise a roll-elevation housing 32, and one or more radial roller bearings. For example, as shown in FIG. 2, two fine-elevation radial roller bearings 34 can be disposed in fine-elevation cavities 36 formed on opposite sides of roll-elevation housing 32 along a fine-elevation rotation axis 38 (shown in FIG. 5). Fine-elevation radial roller bearings 34 can be recessed into fine-elevation cavities 36 formed in roll-elevation housing 32.

Fine-elevation radial roller bearings 34 can be needle radial roller bearings, which provide high load carrying capacity. However, the invention is not limited to this configuration. Alternatively, fine-elevation radial roller bearings 34 can be any suitable type of radial roller bearings. Fine-elevation radial roller bearings 34 can be held in place in fine-elevation cavities 36 using adhesive, interference fitting, or any other suitable method for holding a bearing in place in a cavity.

Fine-elevation rotation axis 38 can be offset from both cross-elevation rotation axis 24 and roll-elevation rotation axis 30 such that each of fine-elevation rotation axis 38, cross-elevation rotation axis 24, and roll-elevation rotation axis 30 can be offset from the other two axes. As shown in the configuration of FIG. 2, each of fine-elevation rotation axis 38, cross-elevation rotation axis 24, and roll-elevation rotation axis 30 can be perpendicular to the other two axes. However, each of fine-elevation rotation axis 38, cross-elevation rotation axis 24, and roll-elevation rotation axis 30 can be offset from the other two axes in a manner in which the axes are not perpendicular to each other.

Roll-elevation assembly 140 can further comprise a pair of first axles 40, and one or more roll-elevation thrust roller bearings 42 that are supported by first axles 40 within an inner cavity of roll-elevation housing 32. First axles 40 can be inserted through roll-elevation holes 44 formed in the roll-elevation housing 32 along a roll-elevation rotation axis 30. In order to hold cross-elevation assembly 130 within inner cavity of roll-elevation housing 32, first axles 40 can be inserted through roll-elevation holes 44 in roll-elevation housing 32, through roll-elevation thrust roller bearings 42 positioned within inner cavity of roll-elevation housing 32, and into roll-elevation radial roller bearings 26 in cross-elevation housing 18. In this manner, roll-elevation assembly 140 can be rotatably connected to cross-elevation assembly 130, such that cross-elevation assembly 130 and roll-elevation assembly 140 can rotate relative to one another on first axles 40 along roll-elevation rotation axis 30.

In one example, the pair of first axles 40 can comprise external threads that mate with complementary threads formed in the roll-elevation housing 32, such as in the roll-elevation holes 44 of the roll-elevation housing 32, to retain the first axles 40 in the roll-elevation housing 32. Of course, the first axles 40 can be retained using another type of interface. For example, the first axles 40 can be retained in the roll-elevation housing 32 using adhesives, a shrink or press fit, or any other interface or interface means as will be apparent to those skilled in the art. These interfaces or interfacing means are also applicable to all of the other axles discussed herein, such as with second axles 48, third axles 62, as well as the respective housings that they couple to or engage with as discussed herein.

Roll-elevation thrust roller bearings 42 can be needle thrust roller bearings, which provide high load carrying capacity. However, the invention is not limited to this configuration. Alternatively, roll-elevation thrust roller bearings 42 can be any suitable type of thrust roller bearings.

In this configuration, first axles 40 comprise a pair of axles. However, the invention is not limited to this configuration. For example, the purpose and function of first axles 40 can also be accomplished by a single axle.

As illustrated in FIG. 2, payload interface assembly 150 can comprise a payload interface housing 46. Payload interface assembly 150 can further comprise a pair of second axles 48, and one or more fine-elevation thrust roller bearings 50 that are supported by second axles 48 within an inner cavity of payload interface housing 46. Second axles 48 can be inserted through fine-elevation holes 52 formed in the payload interface housing 46 along a fine-elevation rotation axis 38. In order to hold roll-elevation assembly 140 within inner cavity of payload interface housing 46, second axles 48 can be inserted through fine-elevation holes 52 in payload interface housing 46, through fine-elevation thrust roller bearings 50 positioned within inner cavity of payload interface housing 46, and into fine-elevation radial roller bearings 34 in roll-elevation housing 32. In this manner, payload interface assembly 150 can be rotatably connected to roll-elevation assembly 140, which can include cross-elevation assembly 130 held within roll-elevation assembly 140, such that roll-elevation assembly 140 and payload interface assembly 150 can rotate relative to one another on second axles 48 along fine-elevation rotation axis 38. Additionally, because cross-elevation assembly 130 is rotatably connected to roll-elevation assembly 140, cross-elevation assembly 130 can turn or rotate along fine-elevation rotation axis 38 together with roll-elevation assembly 140 as roll-elevation assembly 140 turns or rotates on second axles 48.

In this configuration, second axles 48 are a pair of axles. However, the invention is not limited to this configuration. For example, the purpose and function of second axles 48 can also be accomplished by a single axle.

Fine-elevation thrust roller bearings 50 can be needle thrust roller bearings, which provide high load carrying capacity. However, the invention is not limited to this configuration. Alternatively, fine-elevation thrust roller bearings 50 can be any suitable type of thrust roller bearings.

Inner assembly 110 can further comprise one or more positioning targets 14. In one example, the positioning targets 14 can be disposed on and supported by multiple surfaces of payload interface housing 46. Alternatively, positioning targets 14 can be positioned on any, all of, or one or more of payload interface housing 46, roll-elevation housing 32, and cross-elevation housing 18. Positioning targets 14 are part of an integral angle measurement system 104 (shown in FIG. 1) that is integrated into cardan joint 100. The integral angle measurement system 104 and positioning targets 14 are described in further detail below with reference to FIGS. 4 and 5.

Figure 3:
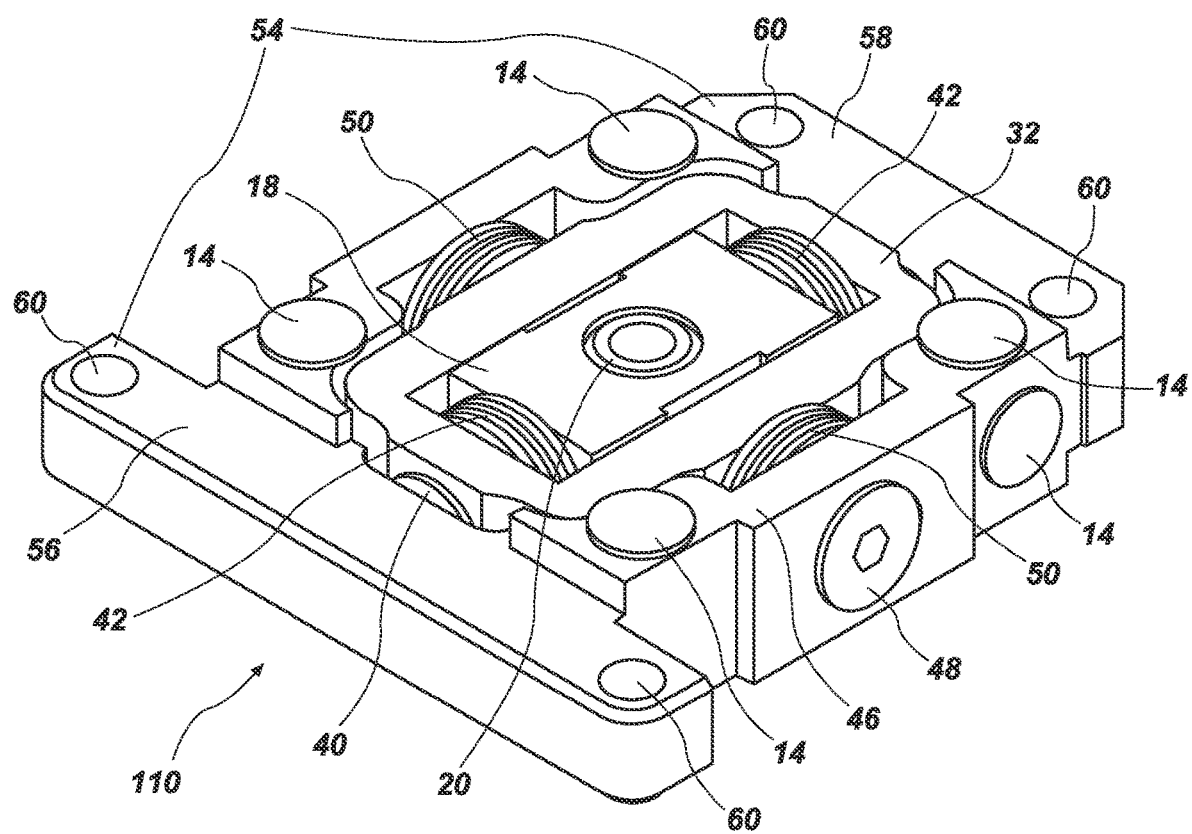
FIG. 3 is an isometric view of an inner assembly of the cardan joint shown in FIG. 1, wherein the inner assembly of the cardan joint comprises an assembly of inner components which are shown without the outermost housing, or in other words, the suspension interface yoke, of the cardan joint.

As shown in FIG. 3, inner assembly 110, and particularly payload interface housing 46, can further comprise a payload interface 54 that operates to couple the payload interface housing 46 to an inertially stabilized payload (not shown). Payload interface 54 can include a front payload interface 56 (e.g., a front mounting structural portion) on one end of payload interface housing 46 and a rear payload interface 58 (e.g., a rear mounting structural portion) on a rear end of payload interface housing 46. As further shown in FIG. 3, one or more payload interface holes 60 can be formed in each of front payload interface 56 and rear payload interface 58. The payload can be coupled to payload interface 54 using known fastening means, such as fasteners, clips, pegs, or other fastener types inserted through the payload and into payload interface holes 60 formed in front payload interface 56 and/or rear payload interface 58. However, the invention is not limited to this configuration. Indeed, the payload can be coupled to payload interface 54 using adhesives, clips, fasteners, or any other suitable method or means for coupling a payload to a housing, with or without utilizing payload interface holes 60 formed in payload interface 54.

With cross-elevation assembly 130 inserted into and rotatably coupled to roll-elevation assembly 140, and with roll-elevation assembly 140 inserted into and rotatably coupled to payload interface assembly 150, the assemblies combined together form inner assembly 110. An exemplary inner assembly 110 is shown in FIG. 3. As shown, cross-elevation housing 18 nests within roll-elevation housing 32, which nests within payload interface housing 46. First axles 40 are inserted through roll-elevation housing 32 and roll-elevation thrust roller bearings 42 to rotatably couple roll-elevation assembly 140 to cross-elevation housing 18. Second axles 48 are inserted through payload interface housing 46 and fine-elevation thrust roller bearings 50 to rotatably couple payload interface assembly 150 to roll-elevation assembly 140. Cross-elevation radial roller bearings 20 are not shown in FIG. 3 to be engaged with any axles. However, as will be described in further detail, cross-elevation radial roller bearings 20 can operate to rotatably connect suspension interface yoke 120 to cross-elevation assembly 130 of inner assembly 110.

As illustrated in FIGS. 1 and 2, suspension interface yoke 120 can house and hold inner assembly 110, including cross-elevation assembly 130, roll-elevation assembly 140, and payload interface assembly 150. Inner assembly 110, in a completely assembled state as shown in FIG. 3, can be inserted into an inner cavity 12 formed in suspension interface yoke 120. Suspension interface yoke 120 can comprise a pair of third axles 62, and one or more cross-elevation thrust roller bearings 64 that are supported by third axles 62 within inner cavity 12 of suspension interface yoke 120. Third axles 62 can be inserted through cross-elevation holes 66 formed in the suspension interface yoke 120 along cross-elevation rotation axis 24. In order to hold inner assembly 110 within inner cavity 12 of suspension interface yoke 120, third axles 62 can be inserted through cross-elevation holes 66 in suspension interface yoke 120, through cross-elevation thrust roller bearings 64 positioned within inner cavity 12 of suspension interface yoke 120, and into cross-elevation radial roller bearings 20 in cross-elevation housing 18. In this manner, suspension interface yoke 120 can be rotatably connected to inner assembly 110 by being rotatably connected to cross-elevation assembly 130 of inner assembly 110.

In this configuration, third axles 62 comprise a pair of axles. However, the invention is not limited to this configuration. For example, the purpose and function of third axles 62 can also be accomplished by a single axle.

Cross-elevation thrust roller bearings 64 can be needle thrust roller bearings, which provide high load carrying capacity. However, the invention is not limited to this configuration. Alternatively, cross-elevation thrust roller bearings 64 can be any suitable type of thrust roller bearings.

As shown in FIG. 2, suspension interface yoke 120 can further comprise suspension interface 10 on one or more sides of cardan joint 100 that are used to couple cardan joint 100 to a larger external system. Suspension interface 10 can include receiving holes 68 for receiving a support structure of the external system. The support structure can include; for example; without limitation, one or more fasteners, one or more suspension or crossbars, clips; brackets, or any other structure suitable for supporting and/or attaching cardan joint 100 in the external system.

With inner assembly 110 being rotatably connected to suspension interface yoke 120 via third axles 62, cross-elevation thrust roller bearings 64, and cross-elevation radial roller bearings 20, each assembly of the inner assembly 110 is free to turn about at least one axis. For example, cross-elevation assembly 130, being rotatably connected to suspension interface yoke 120 via third axles 62, is free to turn about cross-elevation rotation axis 24. Roll-elevation assembly 140, being rotatably connected to the cross-elevation assembly 130 via first axles 40 along roll-elevation rotation axis 30, is free to turn about roll-elevation rotation axis 30, and is further free to turn about cross-elevation rotation axis 24 due to movement of cross-elevation assembly 130 about cross-elevation rotation axis 24. Payload interface assembly 150, being rotatably connected to the roll-elevation assembly 140 via second axles 48 along fine-elevation rotation axis 38, is free to turn about fine-elevation rotation axis 38, and is further free to turn about roll-elevation rotation axis 30, due to movement of roll-elevation assembly 140 about roll-elevation rotation axis 30, and is further free to turn about cross-elevation rotation axis 24, due to movement of cross-elevation assembly 130 about cross-elevation rotation axis 24. Therefore, payload interface assembly 150 is free to turn about all three axes. As such, any payload supported by payload interface assembly 150 is inertially stabilized and allowed to move in three degrees of freedom. In other words, this configuration allows the payload mounted to payload interface assembly 150 to rotate about the intersection of all cardan joint rotation axes: cross-elevation rotation axis 24, roll-elevation rotation axis 30, and fine-elevation rotation axis 38, thus stabilizing the payload, such as in response to outside movements that generate forces acting on the payload through the payload interface assembly 150.

Accordingly, a payload attached to payload interface assembly 150 would be isolated from movement of a system to which cardan joint 100 is attached by three degrees of freedom. Such a configuration is advantageous in that any movement of a system would not affect a payload attached to cardan joint 100, and such payload (e.g. imaging device, camera, optical sensor) would be able to obtain data/images without system movement affecting the data collection.

As shown in FIG. 2, suspension interface yoke 120 can further comprise, as part of an integral angle measurement system 104 (shown in FIG. 1), one or more positional measuring sensors 16 that are supported by suspension interface yoke 120. Positional measuring sensors 16 can detect movement of positioning targets 14, which are supported between suspension interface yoke 120 and payload interface housing 46. Positional measuring sensors 16 can be supported by suspension interface yoke 120 at positions that are adjacent to the positioning targets 14 on inner assembly 110. The integral angle measurement system 104 and positional measuring sensors 16 are described in further detail below with reference to FIGS. 4 and 5.

Figure 4:
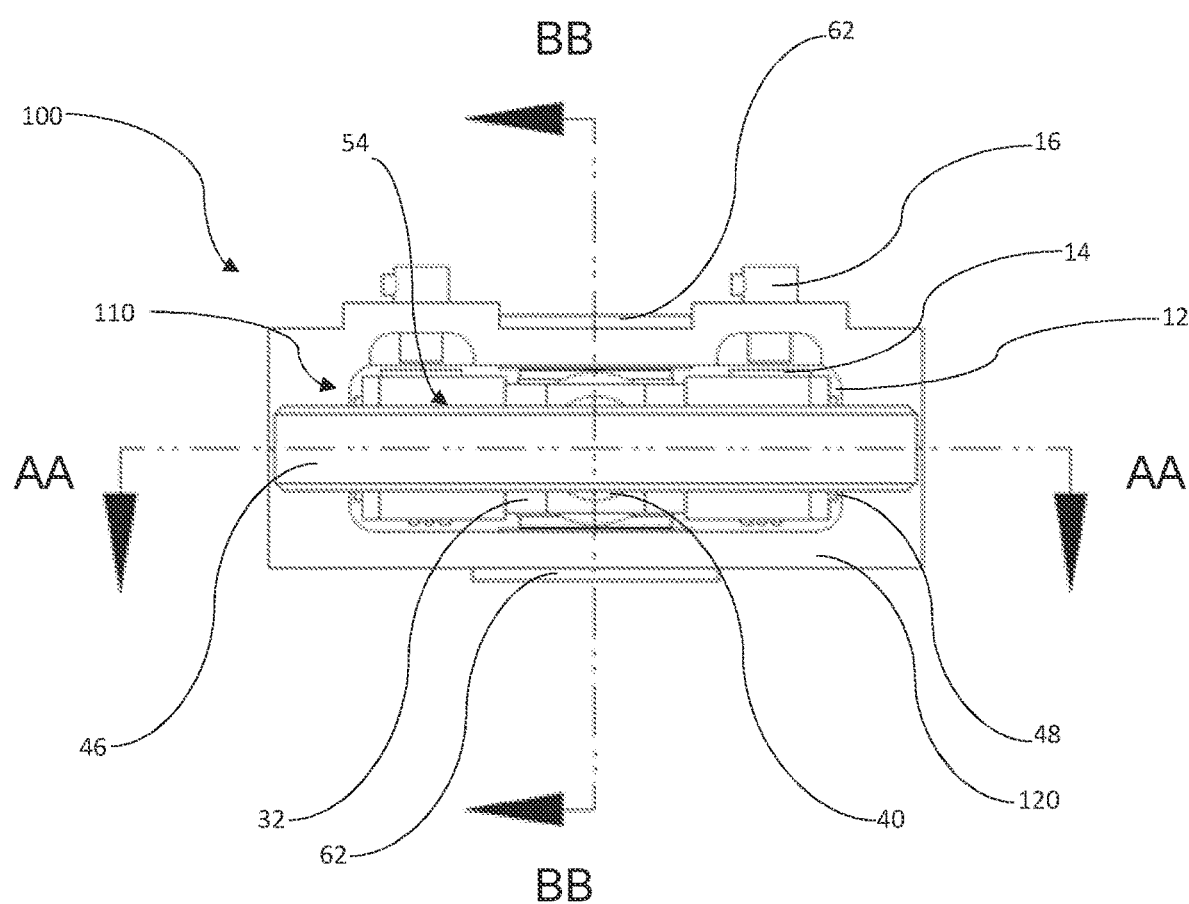
FIG. 4 shows a front view of the cardan joint shown in FIG. 1.

The elements of cardan joint 100 in its assembled state will be further described with reference to FIGS. 4-6. FIG. 4 illustrates a front view of cardan joint 100, showing inner assembly 110 disposed in inner cavity 12 of suspension interface yoke 120. Various elements already described herein are identified in FIG. 4, such as payload interface housing 46, payload interface 54, roll-elevation housing 32, first axles 40, second axles 48, third axles 62, positioning target 14, and positional measuring sensor 16. Although some similar parts are shown more than once, for convenience only one of each part is identified and labeled in FIG. 4. FIG. 4 further shows cross-sectional line AA and cross-sectional line BB.

Figure 5:
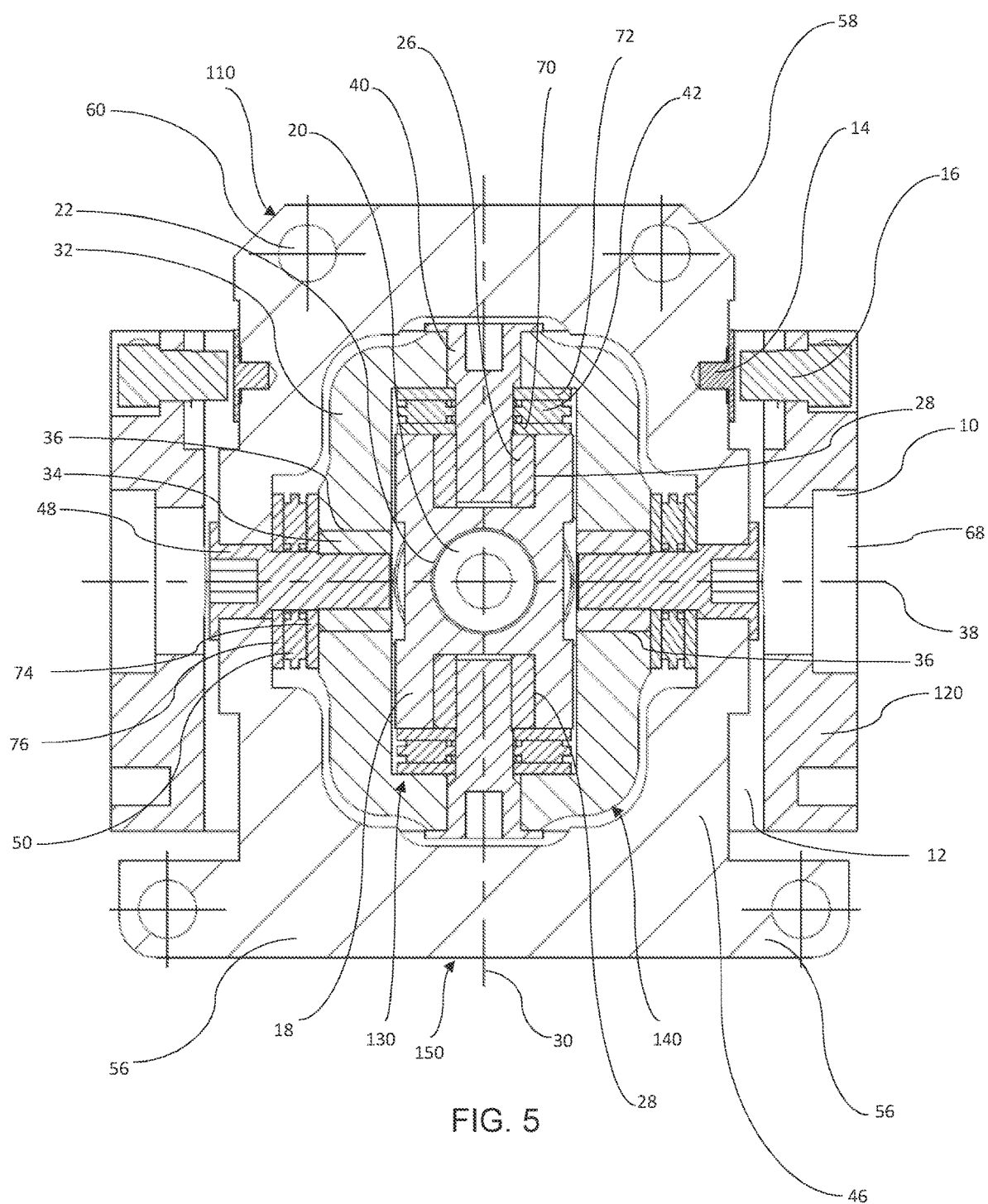
FIG. 5 shows a cross-section of the cardan joint shown in FIG. 1 taken along line AA shown in FIG. 4.

FIG. 5 illustrates a cardan joint 100 taken along cross-sectional line AA. As shown in FIG. 5, inner assembly 110, including cross-elevation assembly 130, roll-elevation assembly 140, and payload interface assembly 150, can be disposed within inner cavity 12 of suspension interface yoke 120. Front payload interface 56 and rear payload interface 58 of payload interface 54 can be disposed outside of inner cavity 12. FIG. 5 further shows that suspension interface 10, including receiving holes 68 formed in suspension interface yoke 120, can be disposed on opposite sides of suspension interface yoke 120.

Cross-elevation assembly 130 can be disposed in a central region of cardan joint 100 and nested within roll-elevation housing 32. Roll-elevation assembly 140 and cross-elevation assembly 130 can be rotatably connected to each other by first axles 40, which can be inserted through roll-elevation housing 32 and roll-elevation thrust roller bearings 42 to engage with roll-elevation radial roller bearings 26 disposed in cross-elevation housing 18.

As further shown in FIG. 5, roll-elevation assembly 140 and cross-elevation assembly 130 can be disposed and nested within payload interface housing 46. Payload interface assembly 150 and roll-elevation assembly 140 can be rotatably connected to each other by second axles 48, which can be inserted through payload interface housing 46 and fine-elevation thrust roller bearings 50 to engage with fine-elevation radial roller bearings 34 disposed in roll-elevation housing 32.

Roll-elevation thrust roller bearings 42 can utilize washers as spacers between roll-elevation thrust roller bearings 42 and other elements in cardan joint 100. For example, a roll inner washer 70 can be disposed on one side of each roll-elevation thrust roller bearing 42 and a roll outer washer 72 can be disposed on an opposite side of each roll-elevation thrust roller bearing 42. In other words, as shown in FIG. 5, roll inner washer 70 can be disposed between each roll-elevation thrust roller bearing 42 and cross-elevation housing 18 and roll outer washer 72 can be disposed between each roll-elevation thrust roller bearing 42 and roll-elevation housing 32. The invention is not limited to these configurations. In another example, roll inner washer 70 can be disposed between each roll-elevation radial roller bearing 26 and each roll-elevation thrust roller bearing 42, and roll outer washer 72 can be disposed on a side of roll-elevation thrust roller bearing 42 that faces away from roll inner washer 70.

A thickness of roll inner washer 70 can be varied for cardan joint 100 in order to eliminate or minimize endplay between roll-elevation thrust roller bearings 42 and cross-elevation housing 18. Similarly, a thickness of roll outer washer 72 can also be varied for cardan joint 100 in order to eliminate or minimize endplay between roll-elevation thrust roller bearings 42 and roll-elevation housing 32.

Similarly, fine-elevation thrust roller bearings 50 can utilize washers as spacers between fine-elevation thrust roller bearings 50 and other elements in cardan joint 100. For example, a fine inner washer 74 can be disposed on one side of each fine-elevation thrust roller bearing 50 and a fine outer washer 76 can be disposed on an opposite side of each fine-elevation thrust roller bearing 50. In other words, as shown in FIG. 5, fine inner washer 74 can be disposed between each fine-elevation thrust roller bearing 50 and roll-elevation housing 32 and a fine outer washer 76 can be disposed between each fine-elevation thrust roller bearing 50 and payload interface housing 46. The invention is not limited to these configurations. In another example, fine inner washer 74 can be disposed between each fine-elevation radial roller bearing 50 and each fine-elevation thrust roller bearing 50, and fine outer washer 76 can be disposed on a side of fine-elevation thrust roller bearing 50 that faces away from fine inner washer 74.

A thickness of fine inner washer 74 can be varied for cardan joint 100 in order to eliminate or minimize endplay between fine-elevation thrust roller bearings 50 and roll-elevation housing 32. Similarly, a thickness of fine outer washer 76 can also be varied for cardan joint 100 in order to eliminate or minimize endplay between roll-elevation thrust roller bearings 42 and payload interface housing 46.

FIG. 5 further shows an exemplary configuration of positioning targets 14 and positional measuring sensors 16. As shown, positioning targets 14 can be supported by, disposed on, or attached to payload interface housing 46 in a position between suspension interface yoke 120 and payload interface housing 46. As further shown, positional measuring sensors 16 can be supported by suspension interface yoke 120 at a position adjacent to at least one positioning target 14, meaning that the positioning targets 14 and the positional measuring sensors 16 are suitably positioned relative to one another, such that the positional measuring sensors 16 are able to detect and sense and measure the relative movements of the positioning targets 14. The invention is not limited to this configuration. For example, positioning targets 14 can be supported by, disposed on, or attached to any of cross-elevation housing 18, roll-elevation housing 32, and/or payload interface housing 46, or any other appropriate element of cardan joint 100. The number of positioning targets 14 and positional measuring sensors 16 used is also not particularly limited. Indeed, any number of positioning targets 14 and positional measuring sensors 16 can be used to measure movement and displacement of inner assembly 110 and any component thereof, including, for example, cross-elevation housing 18, roll-elevation housing 32, and/or payload interface housing 46. Furthermore, a gap may or may not be left between one or more of the positional measuring sensors 16 and their respective adjacent positioning target 14, so long as movement of inner assembly 110 or any component of inner assembly 110 is allowed.

As described herein previously, positioning targets 14 and positional measuring sensors 16 are components of an integral angle measurement system which senses and measures displacement and movement of inner assembly 110 and any component thereof, including, for example, cross-elevation housing 18, roll-elevation housing 32, and/or payload interface housing 46. With reference to FIGS. 1 and 5, the integral angle measurement system 104 operates and functions in the following manner. As inner assembly 110, or any component thereof such as payload interface housing 46, moves within inner cavity 12 of suspension interface yoke 120, then positioning target 14 on payload interface housing 46 moves relative to positional measuring sensor 16 supported by suspension interface yoke 120.

Positional measuring sensor 16 senses and measures movement and or displacement of an adjacent positioning target 14 and generates data based on the measured movement and/or displacement, which data can be analyzed by a computer 108, having one or more processors and one or more memories, utilizing a software program to capture, indicate, categorize or model movement/displacement behavior of payload interface housing 46. Angular movement and displacement of inner assembly 110, cross-elevation housing 18, roll-elevation housing 32, and/or payload interface housing 46 can be measured based on movement/displacement measurements from one or more positioning targets 14 relative to one or more positional measuring sensors 16. Such measurements can be used to provide feedback for controlling each axis of rotation, controlling the payload's line of sight to achieve stable focusing or imaging/sensing of a distant point, and/or report relative position of the payload's line of site relative to a larger system or vehicle to which the payload and cardan joint 100 are attached. Such measurements can be further used to calculate coordinate transformations which can be used to estimate locations of points at which the payload is imaging/sensing. Furthermore, angular movement and displacement measurements can be used to prevent the payload from colliding or contacting other parts of a system to which the payload and cardan joint 100 are attached.

Accordingly, cardan joint 100 provides an advantage of having a cardan joint with an integral angle measurement system 104. Such integral angle measurement system 104 allows for a small and compact cardan joint which also has a capability of measuring displacement and movement of individual components within cardan joint. Therefore, a small compact cardan joint, which provides data, analysis, and feedback on cardan joint movement, can be achieved.

Integral angle measurement, such as via utilizing positioning targets 14 and positional measuring sensors 16, can be achieved using many different types of sensors. For example, relative angular measurement of the three angular degrees of freedom between suspension interface yoke 120 and the payload interface housing 46 can be achieved using three pairs of differential position sensors. The differential position sensors typically use eddy current phenomena, but capacitive, optical or inductive phenomena can be used as well. Integral angle measurement can also be accomplished using inertial sensors, fiber optic gyros, Kaman pickoffs, and/or any other suitable sensors for sensing and determining movement and/or displacement of a target or body.

Figure 6:
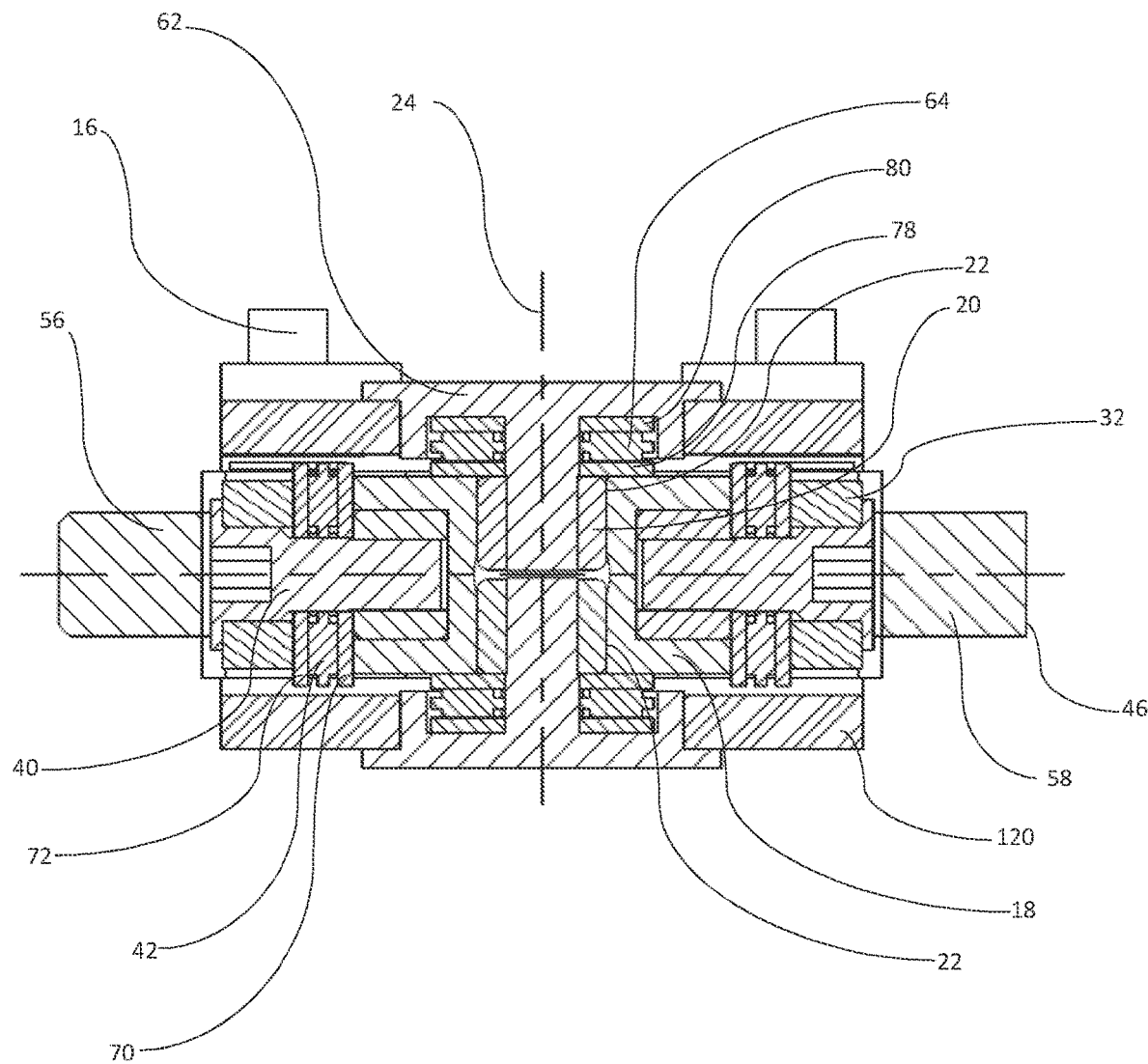
FIG. 6 shows a cross-section of the cardan joint shown in FIG. 1 taken along line BB shown in FIG. 4.

FIG. 6 illustrates cardan joint 100 taken along cross-sectional line BB. As shown in FIG. 6, similar to FIG. 5, inner assembly 110, including cross-elevation assembly 130, roll-elevation assembly 140, and payload interface assembly 150, can be disposed within inner cavity 12 of suspension interface yoke 120. Front payload interface 56 and rear payload interface 58 of payload interface 54 can be disposed outside of inner cavity 12 on opposite sides of suspension interface yoke 120.

Cross-elevation assembly 130 can be disposed in a central region of cardan joint 100 and nested within roll-elevation housing 32. Roll-elevation assembly 140 and cross-elevation assembly 130 can be rotatably connected to each other by first axles 40, which can be inserted through roll-elevation housing 32 and roll-elevation thrust roller bearings 42 to engage with roll-elevation radial roller bearings 26 disposed in cross-elevation housing 18. Roll-elevation assembly 140 and cross-elevation assembly 130 can be disposed and nested within payload interface housing 46.

As mentioned previously, inner assembly 110 can be disposed and nested within suspension interface yoke 120 and cross-elevation assembly 130 can be disposed in a central region of cardan joint 100 and, therefore, can be disposed and nested within suspension interface yoke 120. Cross-elevation assembly 130 and suspension interface yoke 120 can be rotatably connected to each other by third axles 62, which can be inserted through suspension interface yoke 120 and cross-elevation thrust roller bearings 64 to engage with cross-elevation radial roller bearings 20 disposed in cross-elevation housing 18. In other words, suspension interface yoke 120 is rotatably connected to inner assembly 110 of cardan joint 100 by the rotatable connection between cross-elevation housing 18 and suspension interface yoke 120.

Like roll-elevation thrust roller bearings 42 and fine-elevation thrust roller bearings 50, cross-elevation thrust roller bearings 64 can utilize washers as spacers between cross-elevation thrust roller bearings 64 and other elements in cardan joint 100. For example, a cross inner washer 78 can be disposed on one side of each cross-elevation thrust roller bearing 64 and a cross outer washer 80 can be disposed on an opposite side of each cross-elevation thrust roller bearing 64. In other words, as shown in FIG. 6, cross inner washer 78 can be disposed between each cross-elevation thrust roller bearing 64 and cross-elevation housing 18 and cross outer washer 80 can be disposed between each cross-elevation thrust roller bearing 64 and suspension interface yoke 120. The invention is not limited to these configurations. In another example, cross inner washer 78 can be disposed between each cross-elevation radial roller bearing 20 and each cross-elevation thrust roller bearing 64, and cross outer washer 80 can be disposed on a side of cross-elevation thrust roller bearing 64 that faces away from cross inner washer 78.

A thickness of cross inner washer 78 can be varied for cardan joint 100 in order to eliminate or minimize endplay between cross-elevation thrust roller bearings 64 and cross-elevation housing 18. Similarly, a thickness of cross outer washer 80 can also be varied for cardan joint 100 in order to eliminate or minimize endplay between cross-elevation thrust roller bearings 64 and suspension interface yoke 120.

Several advantages are achieved by the example cardan joints described herein over current or existing cardan joints. For example, each axle (e.g. first axles 40, second axles 48, and third axles 62) on rotation axes (e.g., fine-elevation rotation axis 38, cross-elevation rotation axis 24, and roll-elevation rotation axis 30) rotates on multiple bearings of different types. Each axle engages with both a radial roller bearing (e.g., cross-elevation radial roller bearings 20, roll-elevation radial roller bearings 26, and fine-elevation radial roller bearings 34) and a thrust roller bearing (e.g. cross-elevation thrust roller bearings 64, roll-elevation thrust roller bearings 42, and fine-elevation thrust roller bearings 50).

Accordingly, two bearings (thrust and radial) are functioning to support loads on cardan joint 100. Thrust roller bearings support loads in an axial direction and radial roller bearings support loads in a radial direction. Since loads are carried by multiple bearings, instead of both radial and thrust loads being carried by an angular contact bearing, a load carrying capacity of cardan joint 100 is greater than other cardan joints and the potential for failure of cardan joint 100 is reduced over other cardan joints.

Additionally, with the additional carrying capacity of the radial and thrust bearings, and with radial roller bearings (e.g. cross-elevation radial roller bearings 20, roll-elevation radial roller bearings 26, and fine-elevation radial roller bearings 34) being recessed into cavities (e.g. cross-elevation cavities 22, roll-elevation cavities 28, and fine-elevation cavities 36) cardan joint 100 advantageously has a compact design and can meet less restrictive space requirements without sacrificing load carrying capacity, as compared to existing cardan joints.

The inner washers (e.g. roll inner washer 70, fine inner washer 74, and cross inner washer 78) and outer washers (e.g. roll outer washer 72, fine outer washer 76, and cross outer washer 80) which are disposed on opposite sides of each thrust roller bearing (e.g. cross-elevation thrust roller bearings 64, roll-elevation thrust roller bearings 42, and fine-elevation thrust roller bearings 50) of cardan joint 100 are advantageous in that they eliminate or minimize endplay in axles (e.g. first axles 40, second axles 48, and third axles 62) and between components of cardan joint 100.

Furthermore, cardan joint 100 provides an advantage of having a cardan joint with an integral angle measurement system. Such integral angle measurement system allows for a small and compact cardan joint which also has a capability of measuring displacement and movement of individual components within cardan joint. Therefore, a small compact cardan joint, which provides data, analysis, and feedback on cardan joint movement, allows effective line of sight pointing of the outer coarse gimbal with respect to the payload.

Cardan joint 100, as well as how the individual elements of cardan joint 100 are assembled together, has been described with reference to FIGS. 1-6. The function and operation of cardan joint 100 within a larger system will now be described with reference to FIGS. 7A and 7B.

Figure 7A:
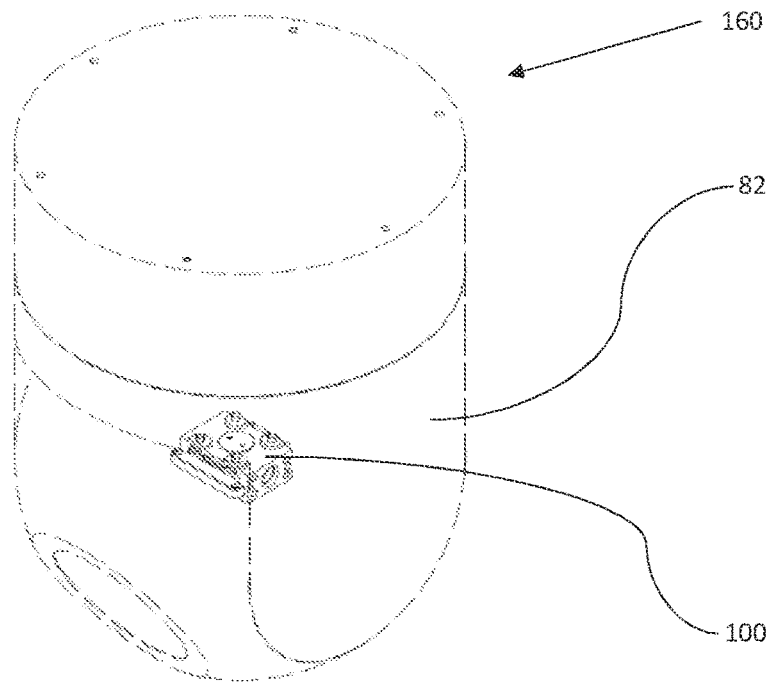
FIG. 7A shows an isometric view of an example system comprising a turret having an outer coarse gimbal and suspension bar assembly in support of the cardan joint of FIG. 1, the turret being shown in dotted lines to illustrate the positioning of the cardan joint.

As shown in FIG. 7A, cardan joint 100 can be part of a system 160 (e.g., a payload system mount), which can be used to house an information-gathering device (not shown) or payload that obtains audio and/or visual information, signals, and/or imagery. The payload, for example, can be a camera, electro-optical sensor, microphone, or other imaging, sensing, and/or measuring device that benefits from stabilization when obtaining data or information. Such payloads can operate on and/or be mounted to a variety of moving vehicles (via the payload mount system) that can travel on or in water, on land, in or through the air, or in space. Such payloads can obtain imagery and/or data by focusing on single distant points in order to obtain the imagery, information, and/or data. In order to stabilize a payload mounted to a moving vehicle to help the payload to obtain stable imagery and data, it is beneficial to mount the payload to one or more gimbals that substantially isolate or decouple the payload, in one or more rotational degrees of freedom, from the movement of the vehicle in order to minimize the effect of vehicle movement on the payload.

Figure 7B:
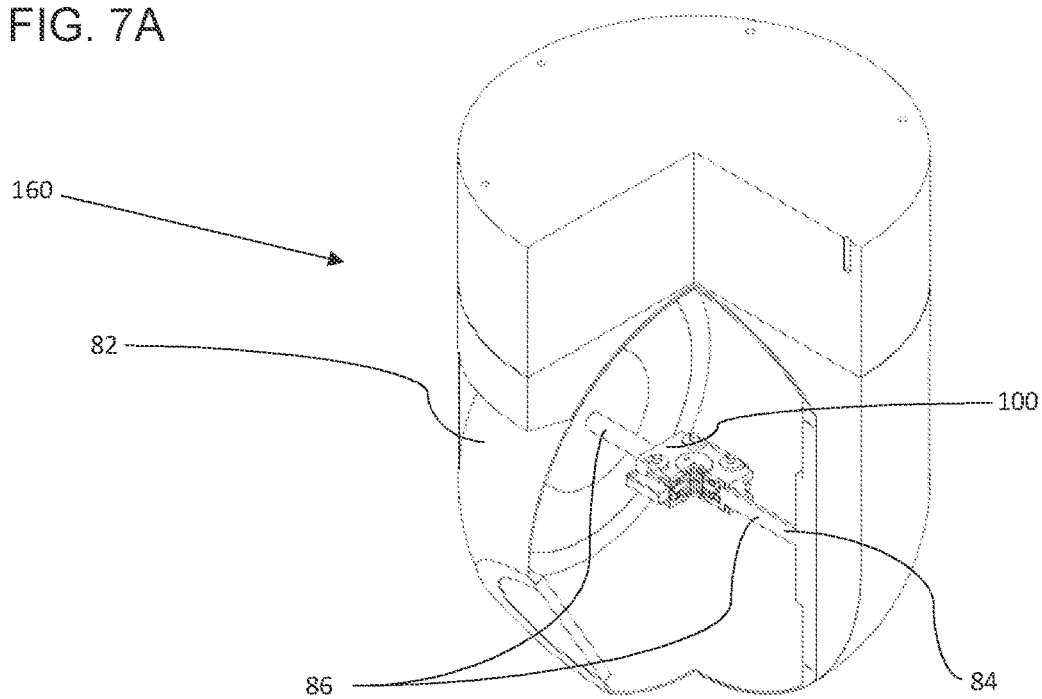
FIG. 7B shows partial isometric view of the example turret of FIG. 7A with its outer coarse gimbal and suspension or cross bar assembly, with a section of the turret cut away to illustrate the cardan joint as supported inside the turret.

For example, the system 160 can comprise a payload system mount in the form of a coarse gimbal 82 (e.g., a two-axis coarse gimbal) that can house the payload, the cardan joint in support of the payload, and a crossbar system that provides suspension support of the cardan joint. The coarse gimbal 82 can comprise one or more orthogonal axes (e.g. 1-3 orthogonal axes) and can be used for coarse pointing of a payload held and housed in the coarse gimbal. As shown in FIG. 7A and FIG. 7B, coarse gimbal 82 can be a turret which houses cardan joint 100 and a payload (not shown) that is mounted on the cardan joint 100. Coarse gimbal 82 can also have systems for measuring relative angles between moving structures of coarse gimbal axes. The relative angle measurements can be used to control each coarse gimbal axis as well as to calculate coordinate transformations that can be used to estimate the distant point location at which the payload will point.

As shown in FIG. 7B, cardan joint 100 can be supported within system 160, and can provide improved vehicle motion isolation for an imaging or other payload. Cardan joint 100 acts as a fine inner gimbal inside of coarse gimbal 82. Addition of a fine inner gimbal (e.g. cardan joint 100) allows for improved and additional isolation from vehicle movement in system 160. As shown cardan joint 100 is attached to the innermost coarse gimbal axis by a crossbar support structure or system 84 which can include one or more suspension or crossbars 86. As shown in FIG. 7B, suspension or crossbars 86 attach to and interface with suspension interface (e.g., see suspension interface 10) of suspension interface yoke (e.g., see suspension interface yoke 120) of cardan joint 100. The specific configuration of the suspension or crossbars 86, and the method of attaching suspension or crossbars 86 to suspension interface 10, as well as the payload system mounts (e.g., a turret) are not described in detail herein. However, example crossbar systems (e.g., those having crossbars and/or crossbar assemblies) configured to provide suspension support of the cardan joint 100 and a payload, such as the cardan joint 100 and a sensor or sensor assembly as described herein, and that can be part of a payload system mount (e.g., a turret mounted to a vehicle that supports the crossbar system in support of the cardan joint 100 and the payload), are described in detail in application Ser. No. 16/721,726, filed Dec. 19, 2019, application Ser. No. 16/721,754, filed Dec. 19, 2019, and application Ser. No. 16/721,792, filed Dec. 19, 2019, and application Ser. No. 16/844,805, filed Dec. 19, 2019, each of which are incorporated by reference in their entirety herein. As such, the present disclosure sets forth a payload mount system comprising a two-axis coarse gimbal set, such as that provided by a turret having a coarse azimuth platform rotatable with respect to a base (the base attachable to a vehicle) and a coarse elevation platform rotatable relative to the azimuth platform, a three-axis fine gimbal set provided by the cardan joint 100 discussed herein, and a crossbar system providing suspension support to the cardan joint 100 and the payload supported by the cardan joint 100, wherein the crossbar system is supported by the coarse elevation platform.

Cardan joint 100 can have one or more orthogonal degrees of limited angular travel. As described, cardan joint 100 has three orthogonal degrees of limited angular travel (three-axis gimbal set), although, in certain applications cardan joint 100 can include more or less degrees of limited angular travel. The limited angular travel of cardan joint 100 can range from 2 degrees to 10 degrees. Although, cardan joint 100 can still be functional with limited angular travel outside of this range.

Cardan joint 100 can have internal relative angle measurement systems, such as integral angle measurement system described herein comprising one or more positioning targets 14 that can be supported between suspension interface yoke 120 and inner assembly 110, and one or more positional measuring sensors 16, which are supported by suspension interface yoke 120 and positioned adjacent positioning target 14. Relative angle measurement of the cardan joint axes (e.g. cross, roll, and fine rotation axes 24, 30, and 38) can be used to keep inner surfaces of the coarse gimbal 82 from colliding with the payload due to limited sway space between payload and inner surfaces of the coarse gimbal and/or the limited angular travel of the cardan joint 100. Inertial sensors (e.g. fiber optic gyros) are used to provide feedback to control the payload line of sight for stable imaging/sensing of a distant point. The relative angle sensors of the various cardan joint axes (e.g. cross, roll, and fine rotation axes 24, 30, and 38) are used to keep the coarse gimbal axes centered on the cardan joint axes and to report relative position of the payload line of sight with respect to the vehicle.

According to the various features, components, and functions of the invention described in this disclosure, the invention described herein presents several improvements over current cardan joint and device stabilization technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A cardan joint comprising:
  a cross-elevation assembly comprising a cross-elevation housing;
  a roll-elevation assembly comprising a roll-elevation housing, and rotatably connected to the cross-elevation assembly along a first rotation axis via one or more radial roller bearings and one or more thrust roller bearings supported between the cross-elevation housing and the roll-elevation housing;
a payload interface assembly comprising a payload interface housing, and rotatably connected to the roll-elevation assembly along a second rotation axis offset from the first rotation axis via one or more radial roller bearings and one or more thrust roller bearings supported between the roll-elevation housing and the payload interface housing; and
a suspension interface yoke comprising a suspension interface operable to couple the suspension interface yoke to one or more suspension bars, wherein the suspension interface yoke is rotatably connected to the cross-elevation assembly along a third rotation axis, offset from both the first rotation axis and the second rotation axis, via one or more radial roller bearings and one or more thrust roller bearings supported between the cross-elevation housing and the suspension interface yoke,
wherein the payload interface housing comprises a payload interface operable to couple the payload interface housing to an inertially stabilized payload.

2. The cardan joint of claim 1, further comprising:
a pair of first axles along the first rotation axis that rotatably connect the roll-elevation housing to the cross-elevation housing;
a pair of second axles along the second rotation axis that rotatably connect the payload interface housing to the roll-elevation housing; and
a pair of third axles along the third rotation axis that rotatably connect the suspension interface yoke to the cross-elevation housing.

3. The cardan joint of claim 2,
wherein the pair of first axles are inserted through holes formed in the roll-elevation housing and into holes formed in the cross-elevation housing;
the pair of second axles are inserted through holes in the payload interface housing and into holes formed in the roll-elevation housing; and
the pair of third axles are inserted through holes formed in the suspension interface yoke and into holes formed in the cross-elevation housing.

4. The cardan joint of claim 2,
wherein the one or more radial roller bearings and the one or more thrust roller bearings supported between the cross-elevation housing and the fine elevation housing are supported on each of the pair of first axles;
the one or more radial roller bearings and the one or more thrust roller bearings supported between the roll-elevation housing and the payload interface housing are supported on each of the pair of second axles; and
the one or more radial roller bearings and the one or more thrust roller bearings supported between the cross-elevation housing and the suspension interface yoke are supported on each of the pair of third axles.

5. The cardan joint of claim 4, wherein each of the plurality of radial roller bearings are needle radial roller bearings; and each of the plurality of thrust roller bearings are needle thrust roller bearings.

6. The cardan joint of claim 4, wherein, on each of the pairs of first, second, and third axles, the one or more radial roller bearings are disposed closer to a center of the cardan joint than the one or more thrust roller bearings.

7. The cardan joint of claim 4, further comprising:
a plurality of inner washers; and
a plurality of outer washers,
wherein, on each of the first, second, and third axles, at least one inner washer of the plurality of inner washers is disposed between the at least one radial roller bearing and the at least one thrust roller bearing, and at least one outer washer of the plurality of outer washers is disposed on a side of the thrust roller bearing that faces away from the inner washer.

8. The cardan joint of claim 1,
wherein, the first rotation axis is perpendicular to the second rotation axis and the third rotation axis,
the second rotation axis is perpendicular to the first rotation axis and the third rotation axis, and
the third rotation axis is perpendicular to the first rotation axis and the second rotation axis.

9. The cardan joint of claim 1, wherein, the cross-elevation assembly, the roll-elevation assembly, and the payload interface assembly are substantially in plane with each other.

10. The cardan joint of claim 1,
wherein the roll-elevation housing is disposed around a perimeter of the cross-elevation housing,
the payload interface housing is disposed around a perimeter of the roll-elevation housing, and
the cross-elevation assembly, the roll-elevation assembly, and the payload interface assembly are at least partially surrounded by the suspension interface yoke.

11. The cardan joint of claim 1 further comprising:
an integral angle measurement system comprising a positioning target supported between the suspension interface yoke and at least one of the cross-elevation, the roll-elevation, or the payload interface housings, and a positional measuring sensor supported by the suspension interface yoke and positioned adjacent the positioning target,
wherein the integral angle measurement system operates to measure movement or positional displacement of the positioning target resulting from movement of the at least one of the cross-elevation, the roll-elevation, or the payload interface housings relative to the suspension interface yoke.

12. The cardan joint of claim 11, wherein the integral angle measurement system further comprises a plurality of positioning targets supported between the suspension interface yoke and the at least one of the cross-elevation; the roll-elevation, or the payload interface housings.

13. The cardan joint of claim 12, wherein the integral angle measurement system further comprises a plurality of positional measuring sensors supported by the suspension interface yoke, each positional measuring sensor being positioned adjacent at least one of the plurality of positioning targets.

14. The cardan joint of claim 13,
wherein at least two positioning targets of the plurality of positioning targets are supported between the suspension interface yoke and the at least one of the cross-elevation, the roll-elevation, or the payload interface housings at directions that are offset from each other, and
at least two positional measuring sensors of the plurality of positional measuring sensors are supported by the suspension interface yoke at positions adjacent the at least two positioning targets.

15. The cardan joint of claim 14, wherein, the at least two positioning targets face in directions that are perpendicular to each other.

16. The cardan joint of claim 13, wherein, the integral angle measurement system is a three-channel differential eddy current measurement bridge.

17. A system for inertially stabilizing a payload, comprising:
- a support structure comprising one or more suspension bars;
- a cardan joint rotatably coupled to the support structure via the one or more suspension bars;
- a payload supported by the cardan joint, the cardan joint comprising:
  - a cross-elevation assembly having a cross-elevation housing;
  - a roll-elevation assembly comprising a roll-elevation housing, and rotatably connected to the cross-elevation assembly along a first rotation axis via one or more radial roller bearings and one or more thrust roller bearings supported between the cross-elevation housing and the fine elevation housing; and
  - a payload interface assembly comprising a payload interface housing, and rotatably connected to the roll-elevation assembly along a second rotation axis offset from the first rotation axis via one or more radial roller bearings and one or more thrust roller bearings supported between the roll-elevation housing and the payload interface housing; and
  - a suspension interface yoke comprising a suspension interface operable to couple the suspension interface yoke to the one or more suspension bars, wherein the suspension interface yoke is rotatably connected to the cross-elevation assembly along a third rotation axis, offset from both the first rotation axis and the second rotation axis, via one or more radial roller bearings and one or more thrust roller bearings supported between the cross-elevation housing and the suspension interface yoke,
  - wherein the payload interface housing comprises a payload interface operable to couple the payload interface housing to the payload.

18. The system of claim 17, wherein the payload comprises an imaging device.

19. The system of claim 17, wherein the payload comprises a sensor.

20. A cardan joint comprising:
- a cross-elevation assembly having a cross-elevation housing;
- a roll-elevation assembly comprising a roll-elevation housing, and rotatably connected to the cross-elevation assembly along a first rotation axis;
- a payload interface assembly comprising a payload interface housing, and rotatably connected to the roll-elevation assembly along a second rotation axis offset from the first rotation axis, the payload interface housing comprising a payload interface operable to couple the payload interface housing to an inertially stabilized payload;
- a suspension interface yoke comprising a suspension interface operable to couple the suspension interface yoke to one or more suspension bars, wherein the suspension interface yoke is rotatably connected to the cross-elevation assembly along a third rotation axis, offset from both the first rotation axis and the second rotation axis; and
- an integral angle measurement system comprising at least one of the cross-elevation, roll-elevation, and payload interface housings, a positioning target supported between the suspension interface yoke and the at least one of the cross-elevation, roll-elevation, and payload interface housings, and a positional measuring sensor supported by the suspension interface yoke and positioned adjacent the positioning target,
- wherein the integral angle measurement system operates to measure positional displacement of the positioning target resulting from movement of the at least one of the cross-elevation, roll-elevation, and payload interface housings relative to the suspension interface yoke.

* * * * *